United States Patent Office 2,753,297
Patented July 3, 1956

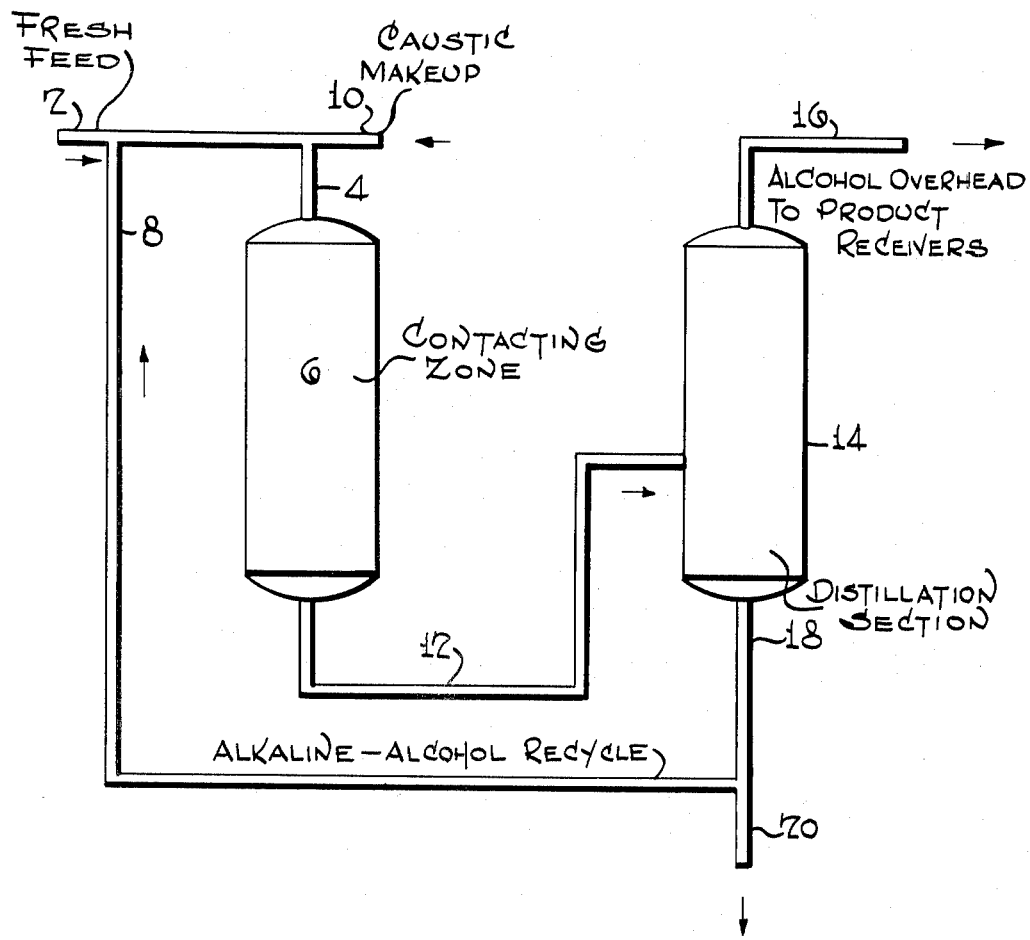

2,753,297

PROCESS FOR REMOVAL OF SULFUR IMPURITIES FROM ALCOHOLS

Ralph B. Mason, Baton Rouge, La., assignor to Esso Research and Engineering Company, a corporation of Delaware Application February 28, 1952, Serial No. 273,967

5 Claims. (Cl. 202—57)

The present invention relates to the preparation of oxygenated organic compounds from olefins by reacting the latter with CO and $H_2$ in the presence of carbonylation catalysts. More specifically, the present invention relates to the purification of alcohol products obtained by the hydrogenation of the aldehyde products derived from this process, particularly when said aldehyde product is hydrogenated in the presence of a sulfur-insensitive catalyst.

The synthesis of oxygenated organic compounds from olefinic compounds and mixtures of CO and $H_2$ in the presence of a catalyst containing metals of the iron group, such as cobalt or iron, preferably the former, is well known in the art. In the first stage, the olefinic material, catalyst and the proper proportions of CO and $H_2$ are reacted to give a product consisting essentially of aldehydes containing one more carbon atom than the reacted olefin. This oxygenated organic mixture, which contains dissolved in it, salts and the carbonyls and molecular complexes of the metal catalyst, is treated in a second stage to cause removal of soluble metal compounds, such as carbonyls, from the aldehyde product in a catalyst removal zone. The catalyst-free aldehyde product is then generally hydrogenated to the corresponding alcohols, and it is to the alcohol thus produced that the present invention applies.

This carbonylation reaction provides a particularlly attractive method for preparing valuable primary alcohols which find large markets particularly as intermediates for plasticizers, detergents and solvents. Amenable to the reaction are long and short chain olefinic and oxygenated olefinic compounds. Thus, straight and branch chained olefins and diolefins, propylene, butylene, styrene, olefin polymers such as di- and tri-isobutylene, polypropylene fractions, olefinic fractions from thermal or catalytic cracking processes and the like, may be used as starting materials.

The catalyst in the first stage may be added as oil soluble salts of the catalytically active metal with high molecular weight fatty acids, such as oleic, stearic, nathenic, and the like, or it may be added as a slurry of the metal or its compounds, or as the carbonyl. Inasmuch as the active catalyst is probably the hydrocarbonyl of the metal, such as cobalt hydrocarbonyl, most forms of the metal may be employed as catalyst, and these are converted into the active species in the course of the reaction.

The synthesis gas mixture fed to the first stage may consist of any ratio of $H_2/CO$, preferably the gases are present in about equal volumes. The conditions for reacting $H_2$ and CO vary somewhat in accordance with the nature of the olefin feed and catalyst form, but the reaction is generally conducted at about 2000–4500 p. s. i. g. and at temperatures in the range of about 250°–450° F. The ratio of synthesis gas to olefin feed may vary widely; in general about 2500 to 15,000 cu. ft. of $H_2$ and CO per barrel of olefin feed are employed.

Following the carbonylation stage, the aldehyde product, containing in solution a considerable amount of dissolved catalyst in the form of carbonyl and other compounds, is generally treated at elevated temperatures in the presence of a gas or vapor, such as hydrogen or steam, to decompose the carbonyl to an oil-insoluble form of cobalt or other metal, and drive off CO formed. Thereafter, the aldehyde product is freed of suspended catalyst metal or compounds, and is passed to a hydrogenation zone for conversion into alcohols.

The hydrogenation stage may be operated at conventional hydrogenation conditions including temperatures, pressures, and gas and liquid feed rates of the same order of magnitude as those obtaining in the first, or carbonylation stage. Various known types of catalyst, such as nickel, tungsten, molybdenum and their oxides or sulfides, supported or unsupported, may be used.

The liquid product from the primary hydrogenation stage is worked up by distillation to separate the desired alcohols from unconverted olefinic feed material, unhydrogenated carbonyl compounds, and hydrocarbons formed in the process. The sulfide catalysts have been found to be especially useful for carrying out this hydrogenation.

The overall carbonylation or so-called "Oxo" reaction as outlined above, provides a particularly effective method for preparing valuable primary alcohols, particularly of the $C_4$ to $C_{20}$ range, which find large markets as intermediates for detergents and plasticizers. The $C_8$ and $C_9$ Oxo alcohol products are especially preferred for use in forming esters to be used as plasticizers in light colored or colorless plastics and resins.

Serious difficulties have been encountered in the primary hydrogenation stage as a result of sulphur poisoning of certain hydrogenation catalysts, when the catalysts used are those such as elementary nickel and others which are sulfur-sensitive. The most readily available olefinic feed stocks for the oxonation reaction are selected hydrocarbon streams derived from petroleum refinery sources and these frequently have sulfur contents as high as 0.1% or even higher. Furthermore, there are a variety of other ways in which sulfur may be introduced into the alcohol product during both the oxonation and hydrogenation stages for reducing the carbonyl compounds. For instance, the fatty acids used to form the metal oxonation catalyst for the purpose of introducing the metal into the reactor as the metallic naphthenate, stearate, or oleate, will usually be found to contain small amounts of sulfur-containing compounds as contaminants, particularly when the fatty acids themselves are of petroleum origin as they frequently are. The synthesis gas used in the oxonation zone which is primarily a mixture of carbon monoxide and hydrogen also may contain sulfur impurities and, in fact, the gaseous reactants employed in both stages of the Oxo reaction usually contain at least traces of sulfur impurities.

Sulfur which is present in the crude reaction mixture containing the carbonyl compounds tends to be carried through the oxonation stage into the hydrogenation stage where it combines with the hydrogenation catalyst to diminish and even completely destroy catalyst activity unless sulfur-insensitive catalysts are used. The sulfur-sensitive hydrogenation catalysts are generally of the elementary metallic type and the deactivating effect of the sulfur on their activity requires frequent reactivation, catalyst replacement, and increased amounts of a catalyst whose cost is definitely a commercial factor and may be prohibitively high. Thus, it has been considered necessary for optimum operation in the hydrogenation step to employ a sulfur-insensitive catalyst. These sulfur-insensitive catalysts include particularly certain metallic sulfide hydrogenating catalysts, examples of such catalysts being nickel sulfide, molybdenum sulfide, tungsten sulfide, and mixtures thereof. While these catalysts have the decided advantage of avoiding the inactivation due to sulfur content of the feed stock, they also possess the disadvantage of permitting much of the sulfur to pass unchanged through the hydrogenation zone and, indeed, in many instances, as when freshly sulfided, tend to introduce additional sulfur contamination into the alcohol. Thus, the final crude alcohol may have a total sulfur content of from 30–100 p. p. m., or in some cases, even higher value.

One of the largest and most important uses developed for the synthetic alcohol products is that of producing esters suitable for plasticizers, by reaction with aliphatic, alicyclic, and aromatic acids or anhydrides, including such examples as phthalic acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols from $C_4$ to $C_{20}$ range such as the butyl alcohols, the octanols, and the nonanols.

These esters are prepared in standard type esterification equipment employing reactors made of stainless steel or other metal, or, in some cases, in glass-lined reaction vessels. In some instances, particularly when the esters were produced in reactors having metallic surfaces exposed to the reacting mixtures, the products were found to be deficient as to the standards required for plasticizers, in such characteristics as odor, color, and plasticizing qualities such as the poor weathering tendency of the resins and plastics in which such plasticizers are used. These undesirable characteristics are believed to be primarily caused by impurities present in the alcohol product and certain of them are caused particularly by the sulfur products present in the alcohol, although other materials which can affect ester color and odor include polymerized and condensed higher molecular weight impurities as well as unreduced carbonyl compounds and other non-alcoholic compounds. It has further been discovered that when sulfur compounds, especially those of the acidic type, are allowed to remain in impure alcohol or aldehyde, they act as catalysts for causing increased condensation reactions which produce acetals and other high molecular weight impurities of the undesirable type. In fact, it has been found that, in order to obtain a high grade alcohol which adequately meets all specifications, the active, color-producing sulfur content should best be reduced to a value somewhere near five parts per million, although somewhat higher total sulfur concentrations can be tolerated, the exact limit of tolerance depending upon the form in which the sulfur occurs.

In general, the sulfur in the synthetic Oxo alcohols is in the form of organically combined sulfur. Although all types of organic impurities in which the sulfur occurs have not been fully determined, it is believed that the sulfur is present in a variety of forms and that it is generally deleterious in most forms when occurring in the final alcohol. Sulfur-containing contaminants cause both odor and color problems as well as act as accelerators to give unwanted properties to the alcohols. The finished alcohol should contain a minimum of sulfur-containing compounds. It is also the best practice to remove most of the carbonyl compounds and potential carbonyl compounds to obtain alcohols which give ester plasticizers of acceptable quality. These purifications are especially necessary if the ester is manufactured in stainless steel equipment and unreacted or excess alcohol is recycled to the esterification zone. A number of types of sulfur-containing impurities are believed to be present and among those probable in an iso-octyl alcohol product prepared from a $C_7$ olefin, are iso-octyl mercaptan, iso-octyl sulfide, diethyl sulfide, diethyl disulfide, dipropyl sulfide, dipropyl disulfide, butyl sulfide, as well as the corresponding sulfinic acids, sulfonic acids, sulfoxides and sulfones.

In typical alcohol recycle esterification operations, a 1% to 20% molal excess of alcohol is used based on the quantity of phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus, undesirable color and odor forming materials, including sulfur-containing impurities, have the opportunity to build up during the recycle stages to a point at which they must be purged from the system before continuing the recycling operation. This presents impurity problems which occur even though the actual reaction is carried out in corrosion-resistant or glass-lined equipment.

There are regularly used a number of modified esterification procedures. Two of the main ones which are widely used for preparation of the dioctyl phthalate ester include the high temperature method in which the one mold of phthalic anhydride is heated with approximately 2 to 2.4 mols of octyl alcohol with no catalyst present and the catalytic method employing an acid as catalyzing agent. In one such method, the ester is recovered by distilling, first, the unreacted alcohol and anhydride, then finally, if it is so desired, by distilling the ester under reduced pressure. It is preferred to use the ester without distilling it, and this can be done if the alcohol used in the esterification is of sufficient purity. Although a number of finishing techniques are used for the ester, in all cases unreacted alcohol is distilled off for recycle. The catalytic method in which benzene sulfonic acid or a similar type material is used as a catalyst may be employed to give catalytic esterification at a lower temperature. The highly purified iso-octyl alcohol products, such as those made from alcohol purified through the borate ester or prepared over a sulfur-sensitive metallic primary hydrogenation catalyst, show practically no color degradation in any method of esterification. Such refined methods of production are, however, prohibitively expensive for large scale commercial production. The ester color can be expressed in a number of ways, for instance, in terms of color absorbency of the ester at a standard wave length of light, a high value indicating a darkened, low quality ester product. The wave length used for studying the di-iso-octyl phthalate ester is 4470 A.

In order to test the effectiveness of a treatment for removing sulfur and sulfur-containing impurities from Oxo alcohol products, it has been found that accelerated esterification tests can be carried out which simulate the conditions present during large scale commercial esterifications, particularly in reactors in which the esterification mixture is exposed to metallic surfaces. One such test consists in carrying out the esterification for a suitable time and at the required temperatures in the presence of suitable metallic strips, the standard esterifications being done in glass type reactors. The strips preferably used and those which give the most reproducible results are of the stainless steel type. This test is considered to be the most rigorous and gives the most complete test of alcohol quality.

In brief, therefore, the small amounts of sulfur appearing in the alcohol product, when this is to be used for plasticizing purposes, play an important role in degrading the resulting ester and making it unfit for use; acetalization appears to be catalyzed by these small amounts, and a sulfur content of greater than about 10–15 parts per million makes the alcohol unsuitable for this purpose.

Thus, in a 100 B./D. plant operation manufacturing octyl alcohol from $C_7$ olefin and passing the intermediate aldehyde product over freshly prepared molybdenum sulfide catalyst supported on activated carbon, the first 14,000 gallons of alcohol produced analyzed for about 12 parts per million of sulfur and produced an ester color of 0.35. Even with this extremly small amount of sulfur, the alcohol was thus unsuitable for use as a plasticizer intermediate for later esterification with phthalic anhydride. The ester color, as indicated above, is a measure of the optical density of the phthalate ester as produced under the prescribed conditions, and is affected by the presence of extremely small amounts of sulfur impurities.

It has, in the past, been a difficult and expensive process to remove the undesirable products present in the carbonylation alcohol, either directly from the latter, or from the feed stream to the carbonylation process. Thus, for example, in the production of iso-octyl alcohol by reacting a heptene fraction with CO and $H_2$ it has been attempted to recover a pure alcohol by caustic washing the crude hydrogenated product to remove acidic constituents, such as mercaptans followed by distillation to remove unreacted feed stock and by-products. Thus one method for decreasing the sulfur content of the final alcohol product is to wash the crude product from the hydrogenation stage with an aqueous solution of caustic, which has the effect of reacting and combining with acidic sulfur constituents in the alcohol product, thereafter separating the aqueous layer from the alcohol layer, followed by water washing the latter to remove traces of entrained or emulsified caustic solution and thereafter distilling the alcohol product. Though marked improvements have been obtained by this technique, the process was not altogether satisfactory. The correlation between sulfur content and ester color broke down on low sulfur values, and further decreases in sulfur content was not always accompanied by corresponding decreases in ester color. Large volumes were required and handling and distillation problems were encountered.

It has now been found that an alcohol of exceptionally low sulfur content and ester color is produced when a sulfur contaminated and high ester color alcohol is treated with solid alkali, such as caustic or caustic potash, in the substantial absence of water and then, without water washing, distilled directly from the treating agent, rather than removal of the latter prior to distillation. The improved treating technique involves an agitation and thorough mixing of the treating agent and alcohol at elevated temperatures, for example, the normal boiling point of the alcohol, and following a period of about 0.5 to 4 hours contact time, the alcohol product is distilled from the alkaline medium. The affinity of the sulfur compounds for the latter reduces substantially the vapor pressure of the contaminants, so that the overhead product is markedly purified as regards sulfur. Furthermore, as discussed and demonstrated more clearly hereinafter, the essential element in decreasing the ester color appears to be the distillation step from the nonaqueous caustic; if the caustic treated product is washed and then distilled rather than distilled directly from caustic, its ester color will not be in all cases satisfactory, even though its sulfur content will be about the same as that of the same or similar sample distilled from caustic.

The present invention and its application will best be understood from the more detailed description hereinafter, wherein reference will be had to the accompanying drawing, which is a schematic representation of a system suitable for carrying out a preferred embodiment of the invention. As the latter resides in the treatment of the hydrogenated products of the Oxo reaction particularly when a sulfactive catalyst is employed in the hydrogenation stage rather than in the carbonylation, catalyst removal, or hydrogenation stages, and since these are now well known in the art, they are, for the sake of brevity, not shown.

Referring now to the drawing, liquid crude alcohol product, which may have a sulfur content of 80–100 parts per million, and an ester color of anywhere up to 2 and even higher (for an alcohol to be suitable for plasticizing purposes, the ester color should be no higher than about 0.15) is passed through lines 2 and 4 into contacting zone 6. As will be explained more fully below, substantially anhydrous caustic dissolved in alcohol product is passed into zone 6 via recycle line 8 and line 4. It is one of the advantages of the present process that contacting with a relatively small amount of caustic is adequate to obtain the advantages of the present invention, and that the treating agent may be continually recycled. As required, make-up caustic, either as solid or preferably dissolved in the alcohol to be treated, is added through line 10.

Within reactor 6 there is maintained a pressure from 0 to 50 p. s. i. g. and a temperature preferably near the boiling point of the alcohol being treated under the pressure conditions in vessel 6. Reflux at atmospheric pressure is often quite convenient. In general, the proportion of alcohol to alkaline treating medium is about 5 to 50, and agitation may be provided by refluxing; if desired, mechanical means of agitation may be employed. Residence time of 0.5 to 4 hours may be employed.

After the desired residence time of contact under agitation in reactor 6, the total mixture is pumped through line 12 into still 14, where, under atmospheric or reduced pressures, the alcohol product is preferably flash distilled from the treating agent. In still 14, desired alcohol product is taken overhead through line 16 and passed to storage; this alcohol is of excellent quality and is suitable without further processing, for employment as an intermediate for preparation of colorless plasticizers. It has a sulfur content of less than 30 parts per million, and an ester color of 0.15 or less.

It is generally not desirable to remove all the treated alcohol by distillation from zone 14; it is considerably more advantageous to retain sufficient alcohol product in the still in order to maintain the desulfurizing alkaline medium in solution. Thus in general about 50–80% of the alcohol passed into zone 14 is withdrawn as overhead product, and the balance recycled with the alkali to the contacting zone, wherein it is contacted with fresh alcohol in amounts equivalent to the alcohol removed via line 16. As the contaminants in the system build up, a portion of the recycle liquid may be withdrawn through line 20, and fresh caustic passed in through line 10. The amount of caustic that will be required to treat a given weight of alcohol depends principally on the extent of contamination of such alcohol with sulfur and other contaminants. Thus for an alcohol product having about 80 p. p. m. of sulfur this amount might be 5 to 20 lbs. alcohol per lb. caustic; if the alcohol product has about 30 p. p. m. sulfur, this amount of caustic may treat 20 to 50 lbs. alcohol.

The process of the present invention may be varied within wide limits and modified in numerous fashions. Thus, though it is generally preferred to submit the crude hydrogenated product prior to the purification stage of the present invention to a preliminary fractionation to separate low boilers (mostly hydrocarbons and sulfur compounds) and high boilers (mostly condensation and polymerization products) from the desired alcohol cut, this is not essential; in fact, a certain proportion of high boilers has the advantage not only of reducing the amount of alcohol that need be left in still 14 to dissolve the alkali medium, but also leads to production of valuable fatty acid by-products at the expense of the secondary reaction products. These acids may be recovered by extraction or steam distillation of the spent caustic to remove unsaponifiable material, followed by acidification of the alkaline soap with mineral acid, water washing, and purification of the recovered fatty acid by distillation. Also, if alkaline materials not appreciably soluble in the alcohol product are employed, a batch rather than a continuous process is indicated, wherein thorough agitation and mixing is provided, followed by distillation of 50–80% of the treated alcohol overhead. The preferred alkaline media however, are those soluble in the alcohol to be treated; solid NaOH, KOH, etc., are preferably employed. In one embodiment of the invention, excellent results are obtained using the alkali alcoholate corresponding to the alcohol being treated; this is readily prepared by dissolving the metal, e. f. sodium, in the alcohol. Furthermore, under certain circumstances, as when the crude alcohol is of fair, but not good, quality, the agitation step may be dispensed with altogether, and the alcohol merely distilled from the non-aqueous alkaline medium. In these cases, interestingly, the ester color is substantially improved whereas the sulfur content is not appreciably affected.

The process of the present invention, and its results, may be further illustrated by the following specific examples. In these examples it is to be noted that specification grade alcohol for colorless plasticizers has a maximum of 15 p. p. m. of sulfur, and a maximum ester color of 0.15.

Example I

Solid sodium hydroxide was added to a charge of high sulfur iso-octyl alcohol product prepared by the carbonylation and hydrogenation of a $C_7$ olefin fraction. The mixture was stirred under reflux conditions in laboratory glass equipment for two hours. The product, without changing flasks, was flash distilled, taking about 60 to 65% of the original alcohol overhead. Then subsequent cycles were made in which the distillate was replaced with fresh alcohol and the refluxing and distilling carried out in a similar manner. No additional caustic was added. Below are data from two series of runs, in each of which six such cycles were employed, one run being with a heavily contaminated, the other with a lightly contaminated alcohol product.

| Run | A | | | B | | |
|---|---|---|---|---|---|---|
| Cycle | Feed | 1 | 6 | Feed | 1 | 6 |
| Total gms. alcohol/gram NaOH | | 10.3 | 43.9 | | 20 | 88.7 |
| Hrs. Agitation under Reflux | | 2 | 2 | | 2 | 2 |
| Vol. Percent Fresh Alcohol Feed | | 100 | 65 | | 100 | 60 |
| Vol. Percent Overhead (Flash Dist.) | | 65 | 65 | | 60 | 60 |
| Overhead Inspections: | | | | | | |
| Sulfur, p. p. m | 81 | 31 | 15 | 8 | 3 | 7 |
| Ester Color | 1.95 | 0.09 | 0.07 | 0.35 | 0.08 | 0.08 |
| Gravity, °API | 37.5 | 37.2 | 37.5 | 38.2 | 38.1 | 38.1 |
| Total Alc. Recovered, Vol. Percent of Charge | | 65 | 93 | | 60 | 90 |

The above results show that off-specification alcohols can be treated with solid NaOH with yields up to 93% of alcohol of outstanding quality as evaluated by the ester color test. The caustic consumption, as can be seen, is very low. At the end of 6 cycles, the performance was as good as at the beginning. As run B indicates, when the sulfur is initially low, excellent ester color improvement may be obtained with very little caustic—an initial concentration of 5% NaOH was sufficient to give the outstanding results shown above.

Example II

The employment of sodium alcoholate is shown in this example, and the results show it to be effective in improving sulfur and ester colors.

| Cycle | 1 | | 2 | | 3 | 4 | 5 |
|---|---|---|---|---|---|---|---|
| Wt. Percent Fresh Alc. | 100 | | 55 | | 55 | 55 | 55 |
| Wt. Percent Overhead | 55 | | 58.7 | | 55 | 55 | 55 |
| Grams Alc./gram Na | 20.3 | | 31.4 | | 42.5 | 53.7 | 64.8 |
| | Feed | Prod. | Feed | Prod. | Prod. | Prod. | Prod. |
| Inspections: | | | | | | | |
| Sulfur, p. p. m | 8 | 1 | 81 | 1 | 1 | 1 | 1 |
| Ester Color | 0.35 | 0.05 | 1.95 | 0.09 | 0.075 | 0.08 | 0.165 |
| Gravity, °API | 38.2 | 38.4 | 37.5 | 37.6 | 37.6 | 37.3 | 37.4 |

The above data show that 65 gms. alcohol/gram of sodium may be treated and still recover an alcohol meeting specification demands in sulfur and ester color.

Example III

As previously pointed out, yields of alcohol of outstanding quality amounting to about 93% of the crude alcohol feed can be obtained by the caustic treatment, the remaining alcohol being associated with the alkaline treating agent. In an investigation of the nature of the product, the alkaline bottoms from some of the runs have been steam distilled, solvent extracted, and the raffinate acidified to yield substantial amounts of fatty acids, useful for preparing the catalyst for the aldehyde synthesis reaction.

| Caustic Treat No. | A | B | C | D |
|---|---|---|---|---|
| Feed | (1) | (1) | (1) | (1) |
| Solvent | | | (2) | (2) |
| No. Cycles | 9 | 3 | 4 | 4 |
| Total gms. Alcohol/g. NaOH | 62.5 | 22 | 33 | 66 |
| Product Recovery: | | | | |
| Purified $C_8$ alcohol, percent Feed | 93 | 79 | 101 | 104 |
| Unsaponifiable, wt., percent Feed | 1 | 5 | 6 | 8 |
| Fatty Acids, wt., percent Feed | 4 | 12 | 15 | 14 |

[1] Distilled iso-octyl alcohol.
[2] High boilers.

These data show appreciable yields of valuable fatty acids, along with purified alcohol. This was particularly evident when the high boiling material, fractionator bottoms, i. e. reaction products boiling above the boiling point range of isooctyl alcohol of about 340 to 390° F., was employed as a solvent. This may be in part due to the reaction of NaOH with the components of these bottoms, though the temperatures are considerably below NaOH fusion temperatures, i. e. where fused caustic reacts with alcohols to convert them into fatty acids.

Example IV

It has been previously pointed out that though initially the decrease in ester color is correlated with decrease in sulfur content, nonetheless at low initial concentrations of sulfur, some alcohol products nonetheless have greater than specification ester colors, and are not suitable for use, without further treatment, as plasticizers. Mere contacting with caustic, either aqueous or solid, is in these cases, not enough. Distillation from the non-aqueous caustic is required. This is brought out in the following example wherein, in case A, the recycle distillation process of the present invention was employed, whereas in case B, the alcohol product, after agitation and refluxing as in case A, was separated from the caustic, water washed, and then distilled. It will be noted that though the sulfur content of both alcohol products was very low, and similar, yet the ester color of the water washed product was not satisfactory, whereas that of the alkali-distilled product was excellent. It will also be noted that this is true in spite of the fact that the ratio of alcohol to treating agent is 4 times as great in Case A as in case B.

| Caustic Treat | Feed | A | B |
|---|---|---|---|
| Cycle | | 6 | 1. |
| Wt. percent Sodium Hydroxide, based on Alcohol | | 10 | 10. |
| Total Grams Alcohol/gram NaOH | | 43.9 | 10. |
| Vol. percent Fresh Alcohol | | 65 | 100. |
| Type Recovery | | Distillation | Water Washing. |
| Vol. percent Overhead | | 65 | |
| Hours[5] Agitation under Reflux (350–400° F.) | | 2 | 2. |
| Product Inspections: | | | |
| Gravity, ° API | 37.5 | 37.5 | 36.9 |
| Sulfur, p. p. m | 81 | 15 | 16. |
| Ester Color | 1.95 | 0.07 | 0.35. |

Example V

To illustrate more clearly that at least with low sulfur alcohols, it is the distillation from the solid caustic that is apparently responsible for the decrease in ester color, rather than further decrease in sulfur alone, the following data are illuminating. In one case, the alcohol product is flash distilled immediately from caustic, while in the second, it is agitated under reflux for two hours prior to distillation.

| Cycle | 1 | 2 and 3 |
|---|---|---|
| Grams alc./gm. NaOH | 9.9 | 22 |
| Vol. Percent Fresh alcohol Feed | 100 | 60 |
| Hrs. Agitation | 0 | 2 |
| Type Distillation | Atm. Flash | Atm. Flash |

| Vol. Percent Overhead | Feed | 0-10 | 10-30 | 30-50 | 50-60 | 60 |
|---|---|---|---|---|---|---|
| Overhead Inspection: | | | | | | |
| Sulfur, p. p. m | 5 | 19 | 13 | 3 | 3 | 1 |
| Ester Color | 0.16 | 0.04 | 0.05 | 0.06 | 0.05 | 0.06 |
| Gravity ° API | 38.3 | 37.5 | 37.6 | 37.5 | 38.2 | 38.4 |

Apparently with alcohol of this quality, agitation prior to distillation is not required to produce improvements in ester color, but without agitation no desulfurization is obtained.

Other modifications and modes of application within the spirit of the invention will be apparent to those skilled in the art.

What is claimed is:

1. A process for the treatment of a water-immiscible primary $C_4$-$C_{20}$ alcohol containing sulfur impurities produced by the Oxo process and from which components more volatile than alcohol have been removed, which comprises contacting said alcohol with a reagent selected from the group consisting of alkali alcoholate, solid caustic alkali and solid caustic alkali dissolved in alcohol at elevated temperatures not above the boiling point of said $C_4$-$C_{20}$ alcohol, at pressures from 0 to 50 p. s. i. g., to form a water-free mixture, and distilling said mixture to produce a purified alcohol product.

2. A process in accordance with claim 1 wherein said reagent is alkali alcoholate.

3. A process in accordance with claim 1 wherein said reagent is solid caustic alkali.

4. A process in accordance with claim 1 wherein said reagent is solid caustic alkali dissolved in alcohol.

5. The process in accordance with claim 1 wherein the treated alcohol containing caustic is passed to a distillation zone, distilling overhead 50-80% of said treated alcohol thereby retaining within the distillation zone sufficient alcohol to keep the caustic in solution, and using the remaining alcoholic solution of caustic as the caustic contacting reagent.

References Cited in the file of this patent

UNITED STATES PATENTS

| | | |
|---|---|---|
| 2,121,954 | Cunningham | June 18, 1938 |
| 2,188,274 | Bump | Jan. 23, 1940 |
| 2,207,111 | Rodenburg | July 9, 1940 |
| 2,315,423 | Hildebrandt | Mar. 30, 1943 |
| 2,320,939 | Leum | June 1, 1943 |
| 2,429,484 | Peters | Oct. 21, 1947 |
| 2,451,857 | Miskel et al. | Oct. 19, 1948 |
| 2,458,049 | Block et al. | Jan. 4, 1949 |
| 2,486,738 | Farber | Nov. 1, 1949 |
| 2,529,209 | Ayo et al. | Nov. 7, 1950 |
| 2,533,754 | Ballard | Dec. 12, 1950 |
| 2,555,185 | Cromeans | May 29, 1951 |
| 2,580,403 | Burton et al. | Jan. 7, 1952 |
| 2,595,786 | Hale et al. | May 6, 1952 |

FOREIGN PATENTS

| | | |
|---|---|---|
| 39,500 | Denmark | Nov. 19, 1928 |